US009455940B2

(12) United States Patent
Watanabe et al.

(10) Patent No.: US 9,455,940 B2
(45) Date of Patent: Sep. 27, 2016

(54) INFORMATION PROCESSING APPARATUS AND INFORMATION PROCESSING METHOD

(71) Applicant: FUJITSU LIMITED, Kawasaki-shi, Kanagawa (JP)

(72) Inventors: Yukihiro Watanabe, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 233 days.

(21) Appl. No.: 14/055,296

(22) Filed: Oct. 16, 2013

(65) Prior Publication Data

US 2014/0149524 A1 May 29, 2014

(30) Foreign Application Priority Data

Nov. 29, 2012 (JP) ................................. 2012-260865

(51) Int. Cl.
G06F 15/16 (2006.01)
H04L 12/58 (2006.01)
G06N 7/00 (2006.01)
G06N 7/02 (2006.01)

(52) U.S. Cl.
CPC ............... H04L 51/12 (2013.01); H04L 51/32 (2013.01); H04L 51/34 (2013.01); G06N 7/005 (2013.01); G06N 7/02 (2013.01)

(58) Field of Classification Search
CPC ....... H04L 51/12; H04L 51/34; H04L 51/32; G06N 7/005; G06N 7/02
USPC .............................. 709/206; 707/754; 706/46
See application file for complete search history.

(56) References Cited

U.S. PATENT DOCUMENTS

| 7,881,984 | B2 * | 2/2011 | Kane et al. ................... 705/26.7 |
| 7,979,371 | B2 * | 7/2011 | Lake ............................... 706/21 |
| 8,160,981 | B2 * | 4/2012 | Aparicio, IV ................. 706/45 |
| 2005/0283680 | A1 | 12/2005 | Kobayashi et al. |
| 2008/0304717 | A1 | 12/2008 | Tsuruta |

(Continued)

FOREIGN PATENT DOCUMENTS

| JP | 10-171521 A | 6/1998 |
| JP | 2006-4346 A | 1/2006 |

(Continued)

OTHER PUBLICATIONS

Japanese Office Action mailed Apr. 19, 2016 for corresponding Japanese Patent Application No. 2012-260865, with Partial English Translation, 5 pages.

(Continued)

Primary Examiner — Jungwon Chang
(74) Attorney, Agent, or Firm — Fujitsu Patent Center

(57) ABSTRACT

An information processing apparatus includes a generating unit configured to generate a message log including a plurality of messages sent from a device, a first calculating unit configured to calculate for the plurality of messages included in the message log a first probability of a case that after a first message occurs a second message occurs within a first period, a second calculating unit configured to calculate a second probability of a case that before the second message occurs the first message occurs within a second period, a third calculating unit configured to calculate a value which indicates a co-occurrence relation of the first message and the second message based on the first probability and the second probability.

3 Claims, 17 Drawing Sheets

(56) References Cited

U.S. PATENT DOCUMENTS

| | | |
|---|---|---|
| 2011/0184806 A1* | 7/2011 | Chen et al. ................. 705/14.52 |
| 2012/0151282 A1 | 6/2012 | Watanabe et al. |
| 2013/0042147 A1 | 2/2013 | Tonouchi |
| 2013/0080367 A1* | 3/2013 | Tonouchi ........................ 706/46 |

FOREIGN PATENT DOCUMENTS

| | | |
|---|---|---|
| JP | 2008-242607 | 10/2008 |
| JP | 2008-305191 | 12/2008 |
| JP | 2008-305291 | 12/2008 |
| JP | 2009-026108 | 2/2009 |
| JP | 2010-277396 | 12/2010 |
| JP | 2012-123694 | 6/2012 |
| WO | 2011/111599 A1 | 9/2011 |

OTHER PUBLICATIONS

Yagi, Yutaka et al.,"Syntax-Directed Dependency Analysis using very Large Japanese Grammar and Lexical Co-Occurrence Relation", Information Processing Society of Japan Technical Report, 2003-FI-72 2003-NL-157, Information Processing Society of Japan Sep. 30, 2003, vol. 2003, No. 98, pp. 17-24, with English Abstract and JPOA filed herewith.

* cited by examiner

FIG. 1

| DATE | TIME | SENDER | MESSAGE CONTENT |
|---|---|---|---|

```
Sep 27 04:40:58.201 sampleapp021 ntpd[2877]: synchronized to 192.168.0.251, stratum 4
Sep 27 04:40:58.202 sampleapp021 syslogd 1.4.1: restart (remote receptior),
Sep 27 04:40:58.228 hostcom100 ntpd[2877]: synchronized to LOCAL(0), stratum 10
Sep 27 04:40:58.241 examplehost001 dhclient: DHCPREQUEST or eth0 to 192.168.15.11 port 67
                                          . . .
Sep 27 04:40:58.270 examplehost023 ntpd[2877]: synchronized to LOCAL(0), stratum 10
Sep 27 04:40:58.279 sampleapp021 ntpd[2877]: synchronized to 192.168.0.251, stratum 4
Sep 27 04:40:58.273 exmaplehost001 ntpd[2868]: synchronized to LOCAL(0), stratum 10
Sep 27 04:40:58.281 apphost238 auditd[24611]: Audit daemon rotating log files
Sep 27 04:40:58.303 hostcom100 ntpd[2877]: time reset +0.394143 s
Sep 27 04:40:58.291 clientexam102 dhclient: bound to 192.168.1.43 -- renewal in 33149
                                          seconds.
                                          . . .
```

CO-OCCURRENCE PERIOD (E.G. 60 min)

C  A  B        A  B A  C        A  B → TIME

| ANTERIOR MSG | POSTERIOR MSG | NUMBER OF OCCURRENCE OF ANTERIOR MSG | NUMBER OF ANTERIOR → POSTERIOR | CO-OCCURRENCE PROBABILITY |
|---|---|---|---|---|
| A | A | 4 | 1 | 0.25 |
| A | B | 4 | 3 | 0.75 |
| A | C | 4 | 1 | 0.25 |
| B | A | 3 | 1 | 0.33 |
| B | B | 3 | 0 | 0.00 |
| B | C | 3 | 1 | 0.33 |
| C | A | 2 | 1 | 0.50 |
| C | B | 2 | 0 | 0.00 |
| C | C | 2 | 0 | 0.00 |

FIG. 5A

|  | X→A | X→B | X→C | X→D |
|---|---|---|---|---|
| A→X | 0.25 | 0.75 | 0.25 | 1.00 |
| B→X | 0.33 | 0.00 | 0.33 | 1.00 |
| C→X | 0.50 | 0.00 | 0.00 | 1.00 |
| D→X | 0.40 | 0.30 | 0.20 | 0.90 |

FIG. 5B

|  | X→A | X→B | X→C | X→D |
|---|---|---|---|---|
| A→X | 0.25 | 0.85 | 0.33 | 0.57 |
| B→X | 0.29 | 0.00 | 0.40 | 0.46 |
| C→X | 0.33 | 0.00 | 0.00 | 0.33 |
| D→X | 0.57 | 0.46 | 0.33 | 0.90 |

FIG. 7

| DATE | MSG TYPE | MESSAGE CONTENT |
|---|---|---|
| 2012-03-13 T10:31:02-09:00 | SV0425 | ServerView RAID, 0, 10526, vcsv01, Adapter [172.26.20.23] LSI 1064SASIME-3030 (8): Adapter missing after reboot, FAILURE=SERVER BLADE, MODEL=BX620 S5 |
| 2012-03-13 T10:35:28-09:00 | PP0099 | machine4:FJSVcsl:A:Rack#0-PCI/DISKBOX#0:SCF:Correctable error count over flow |
| 2012-03-25 T21:00:18-09:00 | SV0188 | Adapter FTS RAID Ctrl SAS 6G 5/6 512MB (D2616) (0): Disk (4) missing after reboot (Server HOST-SERVER), MIB="", SPC="", SVOMHOST="Host-Server", FROM="SERVER_VIEW" |
| ⋮ | ⋮ | ⋮ |

FIG. 8A

| ANTERIOR MSG | POSTERIOR MSG | NUMBER OF OCCURRENCE OF ANTERIOR MSG | NUMBER OF OCCURRENCE WITHIN CO-OCCURRENCE PERIOD (e.g. 60 min) OF POSTERIOR MSG | ANTERIOR MESSAGE ORIGINATING CO-OCCURRENCE PROBABILITY |
|---|---|---|---|---|
| SV0425 | PP0099 | 421 | 421 | 1.00 |
| PP0099 | PP0099 | 10,296 | 10,209 | 0.99 |
| PP0099 | SV0188 | 10,296 | 7,361 | 0.71 |
| .. | .. | .. | .. | .. |

FIG. 8B

| ANTERIOR MSG | POSTERIOR MSG | NUMBER OF OCCURRENCE WITHIN CO-OCCURRENCE PERIOD (e.g. 60 min) OF ANTERIOR MSG | NUMBER OF OCCURRENCE OF POSTERIOR MSG | POSTERIOR MESSAGE ORIGINATING CO-OCCURRENCE PROBABILITY |
|---|---|---|---|---|
| SV0425 | PP0099 | 419 | 10,296 | 0.04 |
| PP0099 | PP0099 | 10,209 | 10,296 | 0.99 |
| PP0099 | SV0188 | 7,200 | 12,126 | 0.54 |
| .. | .. | .. | .. | .. |

FIG. 8C

| ANTERIOR MSG | POSTERIOR MSG | ANTERIOR MESSAGE ORIGINATING CO-OCCURRENCE PROBABILITY | POSTERIOR MESSAGE ORIGINATING CO-OCCURRENCE PROBABILITY | BIDIRECTIONAL CONDITIONAL PROBABILITY |
|---|---|---|---|---|
| SV0425 | PP0099 | 1.00 | 0.04 | 0.077 |
| PP0099 | PP0099 | 0.99 | 0.99 | 0.99 |
| PP0099 | SV0188 | 0.71 | 0.54 | 0.67 |
| .. | .. | .. | .. | .. |

FIG. 13A

| ITEM | VALUE |
|---|---|
| ANTERIOR MSG | PP0099 |
| POSTERIOR MSG | SV0188 |
| MONITORING PERIOD (MIN) | 60 |
| CO-OCCURRENCE PROBABILITY (%) | 67 |
| HANDLING | IGNORE POSTERIOR MESSAGE |

FIG. 13B

| ITEM | VALUE |
|---|---|
| ANTERIOR MSG | PP0099 |
| POSTERIOR MSG | PP0099 |
| MONITORING PERIOD (MIN) | 60 |
| CO-OCCURRENCE PROBABILITY (%) | 99 |
| HANDLING | IGNORE POSTERIOR MESSAGE |

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2012-260865, filed on Nov. 29, 2012, the entire contents of which are incorporated herein by reference.

FIELD

The present invention relates to an information processing apparatus, an information processing method and a program.

BACKGROUND

An information communication technology called cloud computing is becoming popular. The cloud computing is one aspect of the application of the information communication technologies for developing services in the cloud environment in which a variety of resources such as many computers and peripheral devices are deployed on the network.

Devices for establishing the cloud environment such as databases and servers are integrated, maintained and administered in a datacenter. In the datacenter, each device is put under operation and maintenance control by use of message monitoring. Namely, when a failure occurs in a device to be maintained, a message notifying that the failure is detected is reported from the device to an operation administrator's computer.

When the operation administrator receives the report, the operation administrator checks the content of the message. And then, the operation administrator sends a customer engineer according to the content of the failure. The customer engineer carries out a field survey and the like to determine how to deal with the device in which the failure occurs. And, the customer engineer repairs the device or replaces the device and the like.

Here, when a failure occurs in a device, related devices and related applications which are affected by the failure may report messages notifying failures. Thus, when one failure occurs, a plurality of messages are reported from a plurality of devices and the like. In addition, the messages are intermittently reported from the same devices and the like until the customer engineer handles the failure. Therefore, for example, many unnecessary reports are generated when the operation administrator judges the necessity of sending a customer engineer. Then, for example, the operation administrator sorts notification messages into groups. Namely, the operation administrator's computer deals with a plurality of messages which are reported together in relation to one failure. This kind of process is called filtering.

With filtering the messages, the operation administrator may for example check one grouped message in relation to one failure and performs administrative tasks including determination of whether or not a customer engineer is sent. Thus message filtering may reduce the operation administrator's burden.

Patent Document 1

[Patent document 1] Japanese Laid-Open Patent Publication No. 2008-305291

SUMMARY

However, in the above described technologies, the filtering to determine which messages are related together relies on the knowledge and experience of the administrator who configures the filtering. In particular, in the system in which various devices are involved in the service offering or the device configuration is frequently changed, the failure management may not be dealt with.

According to an aspect of the embodiments, it is provided an information processing apparatus including a generating unit configured to generate a message log including a plurality of messages sent from a device, a first calculating unit configured to calculate for the plurality of messages included in the message log a first probability of a case that after a first message occurs a second message occurs within a first period, a second calculating unit configured to calculate a second probability of a case that before the second message occurs the first message occurs within a second period, a third calculating unit configured to calculate a value which indicates a co-occurrence relation of the first message and the second message based on the first probability and the second probability.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a diagram illustrating an example of a message log of messages which are processed by an information processing apparatus according to an embodiment;

FIG. 5A is a table illustrating the co-occurrence probability about messages in an embodiment;

FIG. 5B is a table illustrating a method of calculating the score of a co-occurrence relation in an embodiment;

FIG. 7 is a diagram illustrating an example of messages processed by a information processing apparatus in an embodiment;

FIG. 8A is a table illustrating the co-occurrence probabilities and the scores of co-occurrence relations in an embodiment;

FIG. 8B is a table illustrating the co-occurrence probabilities and the scores of co-occurrence relations in an embodiment;

FIG. 8C is a table illustrating the co-occurrence probabilities and the scores of co-occurrence relations in an embodiment;

FIG. 13A is a table illustrating an example of a filter set in an embodiment;

FIG. 13B is a table illustrating an example of a filter set in an embodiment.

DESCRIPTION OF EMBODIMENTS

The details of an information processing apparatus, an information processing method and a program in an embodiment are described below with reference to the drawings. In the present embodiment, an information processing apparatus operating in connection with a cloud environment such as a datacenter is exemplified in the following descriptions. However, the information processing apparatus in the present embodiment is not limited to the apparatus operating in the cloud environment.

FIG. 1 illustrates an example of a message log of report messages processed by an information processing apparatus in the present embodiment. As illustrated in FIG. 1, report messages are stored in the message log in order of receipt. In addition, the dates and times when the messages are generated by the devices, the sources of messages, the message contents and the like are stored in the message log. Therefore, a large amount of messages from each device in the cloud environment arrive at the information processing apparatus. Further, as indicated by the items such as "sampleapp021" in the "sender" field, messages from a variety of devices are mixed in the message log. Moreover, as indicated by the items such as "04:40:58.201" in the "time" field, the order of messages are inverted due to the time lags among the times set in the devices.

Therefore, it is not easy to define a filter for grouping failure messages received from the individual devices in the systems such as the cloud environment in which a variety of information devices cooperate with each other. In addition, in such a cloud environment the configurations of each device are frequently changed. Therefore, it is not realistic to repeat checking failure messages to define a new filter every time when the configurations are changed. Thus, in the present embodiment, messages with a strong correlation may be extracted together without defining a filter.

First, a comparative example is described below. In the comparative example, a focus is put on the "co-occurrence" relations between a plurality of messages. The term "co-occurrence" here means that when a message occurs another message occurs accompanying with the first message.

Comparative Example 1

Figures 2A, 2B:
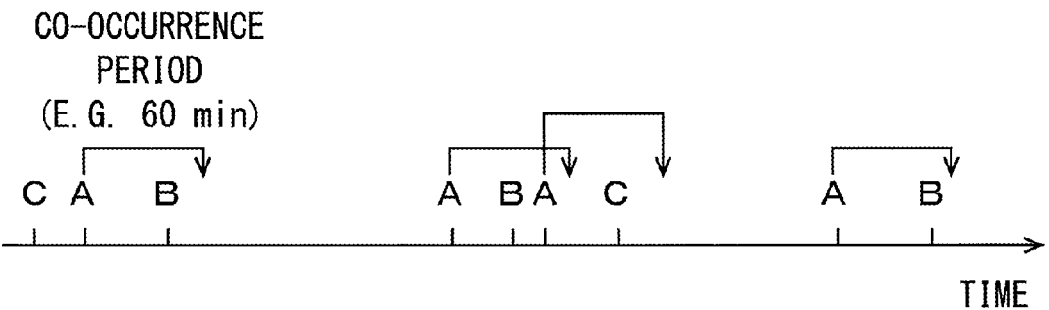
FIG. 2A is a diagram illustrating an example of receiving messages in a comparative example.
FIG. 2B is a table illustrating the number of occurrences and the co-occurrence probability and the like about messages in the comparative example.

FIGS. 2A and 2B schematically illustrate the information processing in the comparative example 1. FIG. 2A illustrates on the time axis how an information processing apparatus receives messages A, B and C between which the correlations are unknown within a certain time range. FIG. 2B is a table illustrating the number of occurrences and the co-occurrence probabilities as for the pairs of the messages in case of the message occurrences illustrated in FIG. 2A. The co-occurrence probability is an index indicating how likely a message co-occurs before or after another message occurs. In FIG. 2B, in a pair of messages, one message which precedes the other message is referred to as "anterior message" and one message which follows the other message is referred to as "posterior message". Further, the "number of occurrences of anterior message" indicates how many times the anterior message occurs. Moreover, a predetermined period after the anterior message occurs is referred to as "co-occurrence period". In FIG. 2B, 60 minutes is set to the co-occurrence period as an example.

And then, the number of occurrences of posterior messages generated within the co-occurrence period after an anterior message occurs is calculated as the "number of anterior→posterior". For example, when a message A is an anterior message and another message A is a posterior message, the posterior message A occurs within the co-occurrence period of 60 minutes after the anterior message A occurs in the example illustrated in FIG. 2A. Thus, the "number of anterior→posterior" is 1 in this case.

In FIG. 2B, co-occurrence probabilities are calculated as the number of occurrences of posterior messages which occur within the co-occurrence period in reference to the number of occurrences of anterior messages within a certain period of time. Namely, in the table illustrated in FIG. 2B "(co-occurrence probability)=(the number of anterior→posterior)/(the number of occurrences of anterior messages)". Thus, FIG. 2B illustrates the number of occurrences of anterior messages, the number of anterior→posterior and the co-occurrence probability for the combinations of anterior message and posterior message in regard to messages A, B and C as illustrated in FIG. 2A.

In an example of receiving messages as illustrated in FIG. 2A, the co-occurrence probability is the highest when the anterior message is A and the posterior message is B. That is, it is assumed that the anterior message A and the posterior message B has a co-occurrence relation which is stronger than a predetermined limit. Therefore, when the message A is received and the message B is received within the co-occurrence period after the message A is received, these messages A and B are grouped as one message.

Here, periodic report messages as well as failure messages are included in messages sent from each device which is administered in a datacenter. The periodic report messages include an alive monitoring message for notifying the operation state of a device, a periodic report for notifying the performance of a device, and an error message reported when a device failure is not dealt with. The notification intervals of these messages differ from according to the message types: every minute, every half an hour, every hour and the like.

Figure 3:
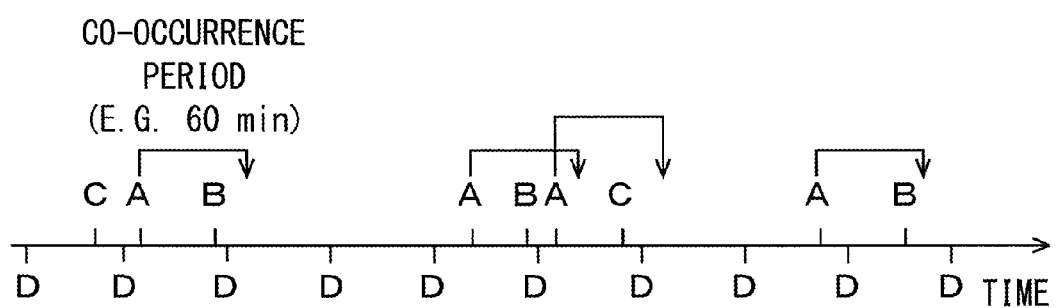
FIG. 3 is a diagram illustrating an example of receiving messages in the comparative example.

Thus, an example of receiving messages illustrated in FIG. 3 in the present comparative example is described below. In FIG. 3, messages D which are reported periodically occur in addition to the example illustrated in FIG. 2A. Further, a message D is a message which does not have correlations between messages A, B and C. As an example, it is assumed that the message A is an anterior message and the message D is a posterior message. Similar to the example illustrated in FIG. 2A, the co-occurrence period is 60 minutes. As illustrated in FIG. 3, each time when a message A occurs a message D occurs within the co-occurrence period. Therefore, following the example of the table in FIG. 2B, since "the number of occurrences of anterior MSG" is 4 and "the number of anterior→posterior" is also 4, the "co-occurrence probability" is 1.00.

That is, in the present comparative example, it is thought that an anterior message A and a posterior message D, which do not have a correlation, have a co-occurrence relation which is stronger than a certain threshold. Otherwise, an anterior message A and a posterior message B are supposed to be grouped because these messages have the co-occurrence relation which is stronger than a certain threshold. However, in this comparative example, the anterior messages A and the posterior messages D, which are determined to have the co-occurrence relation which is stronger than a certain threshold, are also grouped. In addition, in this comparative example, messages are grouped based on the co-occurrence probabilities. Therefore, when the anterior messages A and the posterior messages B are grouped as above, the posterior messages D are also included in the targets of the grouping. Thus, in this comparative example, it may be difficult to group the messages which have correlations with high accuracy.

The above are the descriptions about the comparative example 1. In grouping messages, the more often messages occur the more correlations the messages have with other messages. And, grouping the messages which have a variety of correlations with other messages as described above with high accuracy may contribute to improve the work efficiencies when operation administrators in datacenters evaluate failures and customer engineers sent by the operation administrators handle the failures. Here, the present embodiment in which messages may be grouped with higher accuracy is described below.

Present Embodiment

Figure 4:
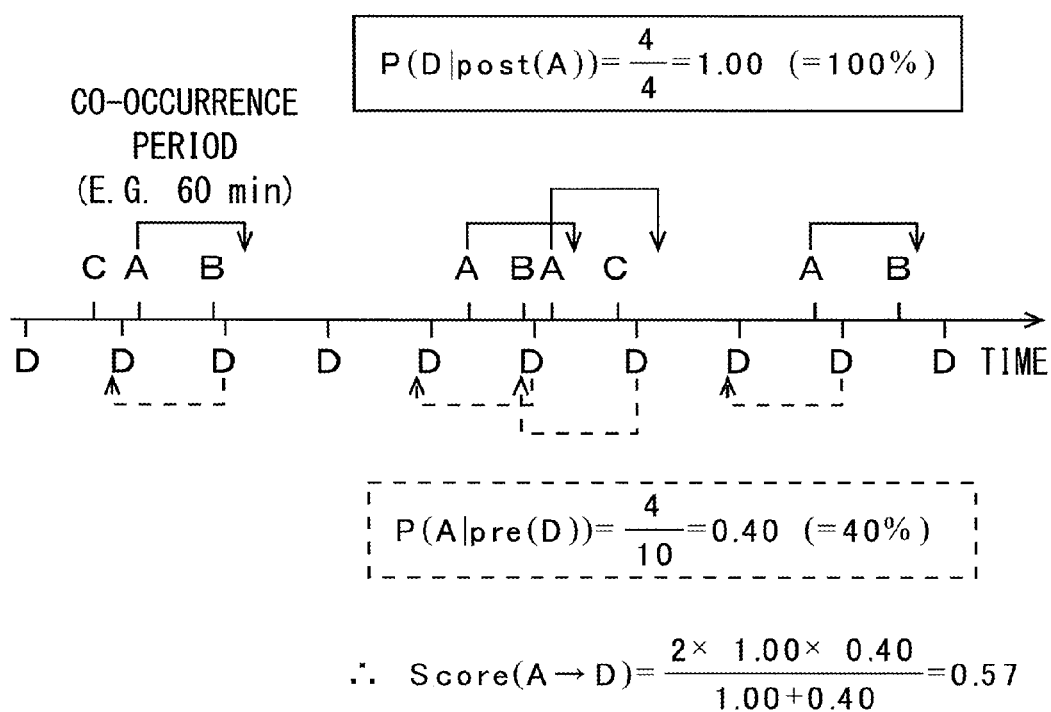
FIG. 4 is a diagram illustrating a method of calculating the score of a co-occurrence relation in an embodiment.

FIG. 4 illustrates an example of receiving messages in the present embodiment. As illustrated in FIG. 4, messages A to D are the same as in the comparative example and the timing of receiving messages are also the same as above. An information processing apparatus according to the present embodiment calculates the probabilities how likely posterior messages occur after anterior messages occur in the cloud environment and the like. Next, the information processing apparatus calculates the probabilities how likely the anterior messages occur before the posterior messages occur. Further, the information processing apparatus calculates the co-occurrence relation scores, which are the values indicating the co-occurrence relation between the anterior messages and the posterior messages, in consideration of the above probabilities. Moreover, the information processing apparatus groups the anterior messages and the posterior messages based on the calculated co-occurrence relation scores. The details are described later.

As illustrated in FIG. 4, it is described here how the co-occurrence probabilities are calculated in case that an anterior message is A and a posterior message is D. In the present embodiment, the co-occurrence probability is defined by the following equation (1) when the messages D occur within a co-occurrence period (for example, 60 minutes) after the messages A occur.

$$P(D \mid \text{post}(A)) = \frac{\text{(the number of occurrences of } MSG\ D \text{ which occurs within the co-occurrence period after } MSG\ A \text{ occurs)}}{\text{(the number of occurrences of } MSG\ A\text{)}} \quad (1)$$

Additionally, the co-occurrence probability is defined by the following equation (2) when the messages A occur within a co-occurrence period (for example, 60 minutes) before the messages D occur.

$$P(A \mid \text{pre}(D)) = \frac{\text{(the number of occurrences of } MSG\ A \text{ which occurs within the co-occurrence period before } MSG\ D \text{ occurs)}}{\text{(the number of occurrences of } MSG\ D\text{)}} \quad (1)$$

Further, the harmonic mean of the co-occurrence probabilities calculated by the equations (1) and (2) is defined by the following equation (3).

$$\text{Score}(A \to D) = HM(P(D \mid \text{post}(A)), P(A \mid \text{pre}(D))) = \frac{2 \times P(D \mid \text{post}(A)) \times P(A \mid \text{pre}(D))}{P(D \mid \text{post}(A)) + P(A \mid \text{pre}(D))} \quad (3)$$

And then, the information processing apparatus according to the present embodiment uses the values calculated by the equation (3) as the indexes indicating the strength of the co-occurrence relations. In the present embodiment, the value calculated by the equation (3) is referred to as "co-occurrence relation score". In addition, the information processing apparatus according to the present embodiment calculates the co-occurrence probabilities and the co-occurrence relation scores by the equations (1) to (3) for the other messages.

Referring to FIG. 4, the number of occurrences of the message A is 4. In addition, the number of occurrences of the message D which occurs within the co-occurrence period after the message A occurs is 4. Therefore, the information processing apparatus obtains a value of 1.00 from the equation (1). Incidentally, in the present embodiment, the values obtained from each equation are written to two significant figures. Next, the number of occurrences of the message D is 10. And, the number of occurrences of the message A which occurs within the co-occurrence period before the message D occurs is 4. Therefore, the information processing apparatus obtains a value of 0.40 from the equation (2). Here in the present embodiment, when the information processing apparatus calculates the probability of occurrence of each message using the equations (1) and (2), the information processing apparatus regards that the number of occurrences of a message is 1 even when the message occurs more than once within the co-occurrence period. Moreover, although the co-occurrence period is 60 minutes in the above equations (1) and (2), different periods may be applied to each equation as the co-occurrence period.

Next, the co-occurrence relation score of the anterior message A and the posterior message D is 0.57 from the equation (3). In this way, the information processing apparatus may calculate the co-occurrence relation scores for the combinations of the anterior messages and the posterior messages in regard to messages A to D.

FIG. 5A illustrates the values of the co-occurrence probabilities for the combinations of the anterior messages and the posterior messages in the comparative example 1. In addition, FIG. 5B illustrates the values of the co-occurrence probabilities for the combinations of the anterior messages and the posterior messages in the present embodiment. In FIGS. 5A and 5B, "A→X" means that the anterior message is A and the posterior message is X (X is one of A to D). Further, "X→A" means that the anterior message is X and the posterior message is A. For example, the value of the entry in the first row and the first column which are designated by the combination of the first row "A→X" and the first column "X→A" is 0.25 and this value denotes the co-occurrence probability in the case of "A→A".

As illustrated in FIG. 5A, the co-occurrence probabilities are higher in the comparative example 1 when the anterior message is A, B or C and the posterior message is D. In addition, these co-occurrence probabilities are higher than that in case that the anterior message is A and the posterior message is B. Therefore, since the co-occurrence probabilities become higher even when the messages A, B and C do not have correlations with the messages D which periodically occur, the messages A, B and C are grouped with the messages D.

To the contrary, as illustrated in FIG. 5B, the co-occurrence relation scores incase that the anterior message is A, B or C and the posterior message is D are calculated to be significantly low scores in the present embodiment. Further, the co-occurrence score in case that the anterior message is A and the posterior message is B is calculated to be higher than the values of the co-occurrence probability illustrated in FIG. 5A. In the present embodiment, as described later, the messages which the information processing apparatus receives are stored in a message log in the information processing apparatus. Therefore, in the present embodiment, when the co-occurrence relations are determined in the messages stored in the message log, the co-occurrence relations with the messages which periodically occur and do not have correlations with the other failure messages and the like may be estimated weaker than those in the above comparative example. At the same time, the co-occurrence relations with the messages which may be regarded as actually having correlations may be estimated higher than those in the above comparative example.

Figure 6A:
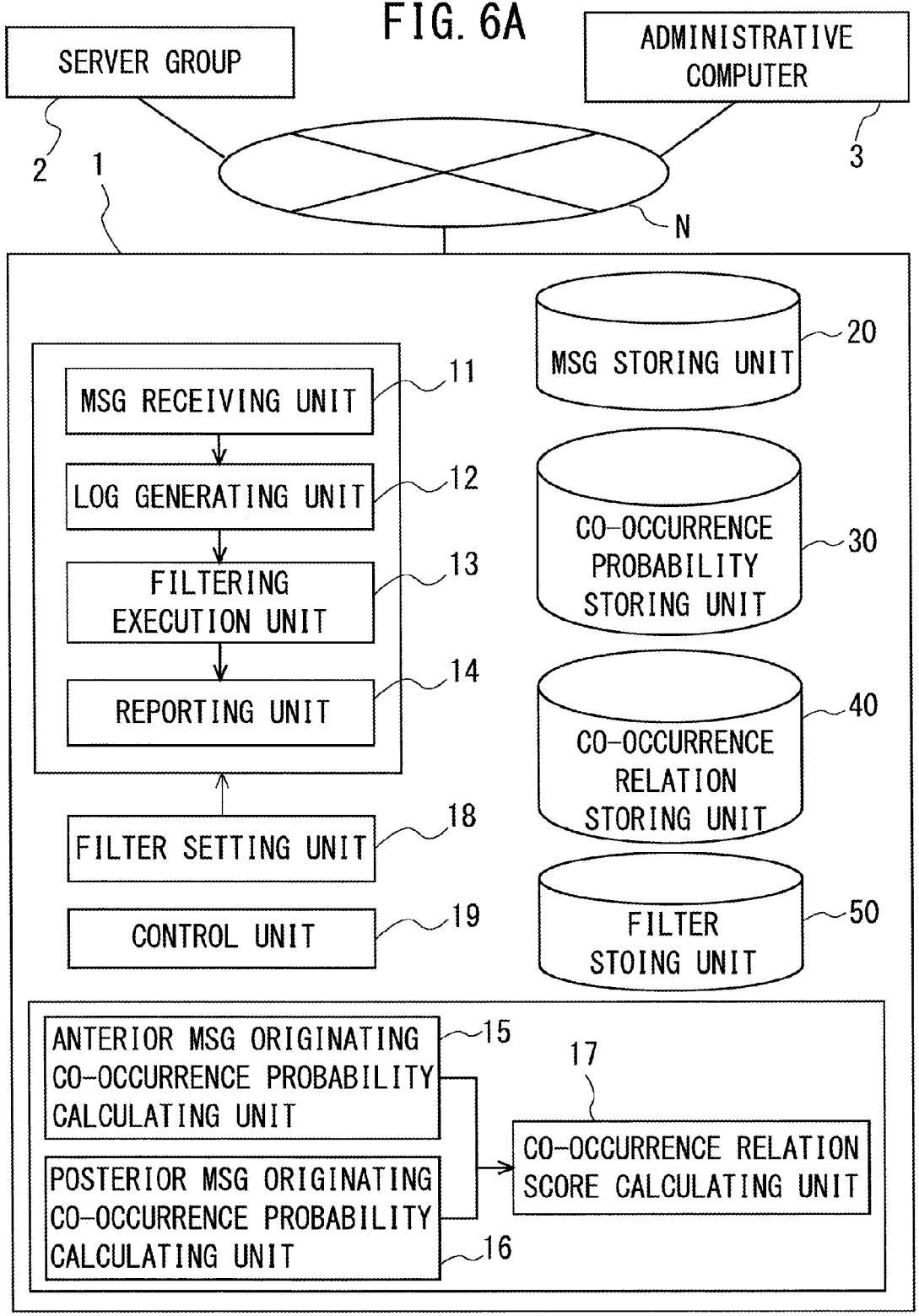
FIG. 6A is a block diagram illustrating a schematic configuration of an information processing apparatus in an embodiment.

Next, the descriptions are made for the information processing apparatus which uses a method for determining the correlations based on the co-occurrence relation score as described above. FIG. 6A is a schematic block diagram illustrating the configurations of the information processing apparatus 1 in the present embodiment. As illustrated in FIG. 6A, the information processing apparatus 1 is connected via the network N with the server group 2 from which messages are received. Intranet, LAN (Local Area Network), the Internet and the like exemplify the network N. In addition the information processing apparatus 1 is connected via the network N with an administrative computer 3 which an operation administrator in a datacenter uses.

The information processing apparatus 1 includes a message receiving unit 11, a log generating unit 12, a filtering execution unit 13, a reporting unit 14, an anterior message originating co-occurrence probability calculating unit 15, a posterior message originating co-occurrence relation probability calculating unit 16, a co-occurrence relation score calculating unit 17, a filter setting unit 18, a control unit 19, a message storing unit 20, a co-occurrence probability storing unit 30, a co-occurrence relation storing unit 40 and a filter storing unit 50. The processes performed by each unit are controlled by the control unit 19. In addition, the details of each process are described later.

Figure 6B:
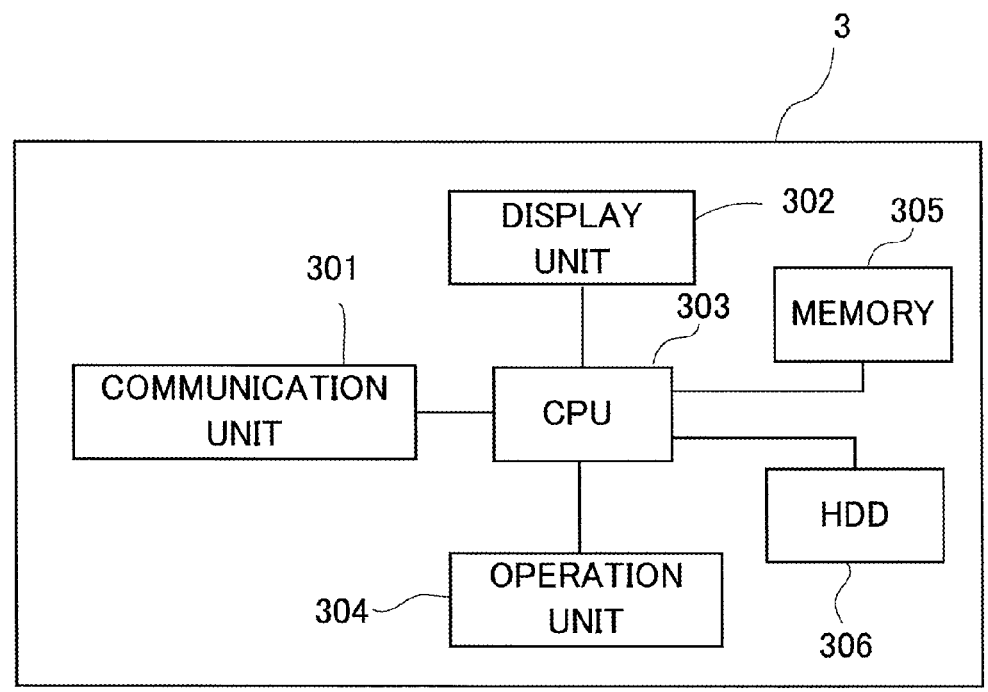
FIG. 6B is a block diagram illustrating a schematic configuration of an administrative computer in an embodiment.

FIG. 6B is a schematic block diagram illustrating the configurations of the administrative computer 3 in the present embodiment. The administrative computer 3 includes a communication unit 301, a display unit 302, a CPU (Central Processing Unit) 303, an operation unit 304, a memory 305 and an HDD (Hard Disc Drive) 306. The communication unit 301 communicates via the network N with each device such as the information processing apparatus 1 and the server group 2. The display unit 302 displays messages based on the reports received from the information processing apparatus 1 as described below and displays the results of a variety processes performed by the CPU 303. The CPU 303 controls the operations of each unit in the administrative computer 3. The operation unit 304 accepts a variety of operations performed by an administrator to the administrative computer 3. The memory 305 is a storage area for deploying programs and the like used by the CPU 303. Additionally, the memory 305 is also used as a location for temporarily storing data when the CPU 303 executes a program. The HDD 306 is a mass storage device and stores a variety of programs used by the CPU 303 and the data and the like received via the network N.

A variety of devices of which the failures and the like are administered are integrated as the server group 2. A variety of messages which are generated from each device included in the server group 2 are sent to the information processing apparatus 1 via the network N. The message receiving unit 11 of the information processing apparatus 1 receives a variety of messages from the server group 2. Various conventional receiving devices may exemplify the message receiving unit 11. The message receiving unit 11 sends the received messages to the log generating unit 12.

The log generating unit 12 sequentially adds the messages received from the message receiving unit 11 to a message log stored in the message storing unit 20. FIG. 7 illustrates an example of messages stored in a message log.

As illustrated in FIG. 7, the "date/time" when a message is generated in a device in the server group 2 is stored in the message log. This date/time is set in a message by the device which generates the message. Further, a message type is stored in the message log. The "message type" includes the information indicating from which type of device a message is generated and what number message is generated in a device. For example, as for "SV0425" in FIG. 7, "SV" indicates a server and "0425" indicates the 425th message. Moreover, the "message content" indicating the failures and the operation statuses and the like of the device which generates a message is also stored therein. In addition, other information may be added to the message log according to the message structure.

In the present embodiment, the control unit 19 controls the anterior message originating co-occurrence probability calculating unit 15 and the posterior message originating co-occurrence probability calculating unit 16 to calculate the co-occurrence probabilities of the messages which generated within a predetermined time duration. Taking FIG. 4 as an example, message A occurs four times, message B occurs three times, message C occurs two times and message D occurs ten times within the predetermined time duration. The anterior message originating co-occurrence probability calculating unit 15 and the posterior message originating co-occurrence probability calculating unit 16 calculates the co-occurrence probabilities based on the messages A to D and the number of occurrences of each message. Here, the predetermined time duration is a time range appropriately defined by multiplying the co-occurrence period by a predetermined factor so as to calculate the co-occurrence probability and the co-occurrence relation score. In addition, instead of defining the above predetermined time duration using the co-occurrence period, an arbitrary time duration may be specified in advance, and the control unit 19 may be configured to use the specified time duration to control the anterior message originating co-occurrence probability calculating unit 15 and the posterior message originating co-occurrence probability calculating unit 16 and the like.

In the present embodiment, the anterior message originating co-occurrence probability calculating unit is a processing unit for calculating a co-occurrence probability regarding the messages generated in the predetermined time duration in case that a posterior message occurs within the predetermined co-occurrence period after an anterior message occurs. And the posterior message originating co-occurrence probability calculating unit is a processing unit for calculating a co-occurrence probability regarding the messages generated in the predetermined time duration in case that an anterior message occurs within the predetermined co-occurrence period before a posterior message occurs.

The control unit 19 detects that a new message is added to a message log in the message storing unit 20. When the control unit 19 detects the addition of the new message to the message log, the control unit 19 instructs the anterior message originating co-occurrence probability calculating unit 15 and the posterior message originating co-occurrence probability calculating unit 16 to calculate the co-occurrence probabilities. The anterior message originating co-occurrence probability calculating unit 15, which receives the instruction, refers to the message log stored in the message storing unit 20. And then, the anterior message originating co-occurrence probability calculating unit 15 calculates the co-occurrence probabilities of the added message as the anterior message and the posterior messages which occur within the co-occurrence period.

FIG. 8A illustrates an example of the results stored in the co-occurrence probability storing unit 30 which the anterior message originating co-occurrence calculating unit 15 calculates. As illustrated in FIG. 8A, the co-occurrence probability storing unit 30 stores the number of occurrences of an anterior message, the number of occurrences of a posterior message within the co-occurrence period (60 minutes in this example) after the anterior message occurs and the co-occurrence probability of the anterior message and the posterior message which occurs within the co-occurrence period with designating the anterior message as the starting point as for three combinations of messages. The three combinations of messages in this example correspond to a case in which the anterior message is SV0425 and the posterior message is PP0099, a case in which the anterior message and the posterior message is PP0099 and a case in which the anterior message is PP0099 and the posterior message is SV0188.

On the other hand, the posterior message originating co-occurrence probability calculating unit 16 receives the above instruction and refers to the message log stored in the message storing unit 20. And then, the posterior message originating co-occurrence probability calculating unit 16 regards the added message as a posterior message to calculate the co-occurrence probability of the posterior message and an anterior message which occurs within the predetermined co-occurrence period. Incidentally, since the specific calculations of the co-occurrence probabilities are as described above, the detailed descriptions are omitted here.

FIG. 8B illustrates an example of the results stored in the co-occurrence probability storing unit 30 which the posterior message originating co-occurrence calculating unit 16 calculates. As illustrated in FIG. 8B, the co-occurrence probability storing unit 30 stores the number of occurrences of an anterior message within the co-occurrence period before a posterior message occurs, the number of occurrences of the posterior message and the co-occurrence probability of the posterior message and the anterior message which occurs within the co-occurrence period with designating the posterior message as the starting point as for the same combinations of messages as in FIG. 8A.

The co-occurrence probabilities calculated by the anterior message originating co-occurrence probability calculating unit 15 and the posterior message originating co-occurrence probability calculating unit 16 are stored in the co-occurrence probability storing unit 30. Next, the co-occurrence relation score calculating unit 17 uses the co-occurrence probabilities stored in the co-occurrence probability storing unit 30 to calculate the co-occurrence relation scores for the combinations of anterior messages and posterior messages. Incidentally, since the specific calculations of the co-occurrence relation scores are as described above, the detailed descriptions are omitted here. The co-occurrence relation scores calculated by the co-occurrence relation score calculating unit 17 are stored in the co-occurrence relation storing unit 40.

FIG. 8C illustrates an example of the results stored in the co-occurrence relation storing unit 40 which the co-occurrence relation score calculating unit 17 calculates. As illustrated in FIG. 8C, the co-occurrence relation storing unit 40 stores the co-occurrence probability of an anterior message and a posterior message which occurs within the co-occurrence period with designating the anterior message as the starting point, the co-occurrence probability of a posterior message and an anterior message which occurs within the co-occurrence period with designating the posterior message and the co-occurrence relation score as the starting point as for the same combinations of messages as in FIG. 8B.

The filter setting unit 18 sets a filter which defines a process performed in case that a message occurs based on the co-occurrence relation score stored in the co-occurrence relation storing unit 40. The filters set by the filter setting unit 18 are stored in the filter storing unit 50. The filtering execution unit 18 obtains a filter stored in the filter storing unit 50. And then, the filtering execution unit 13 filters messages received from the log generating unit 12 according to the obtained filter. The filtering results of the filtering execution unit 13 are sent to the reporting unit 14. The reporting unit 14 reports the failures and the operation statuses of the devices to the administrative computer 3 based on the filtering results. Incidentally, the details of the processes performed by each unit are described later.

Figure 9:
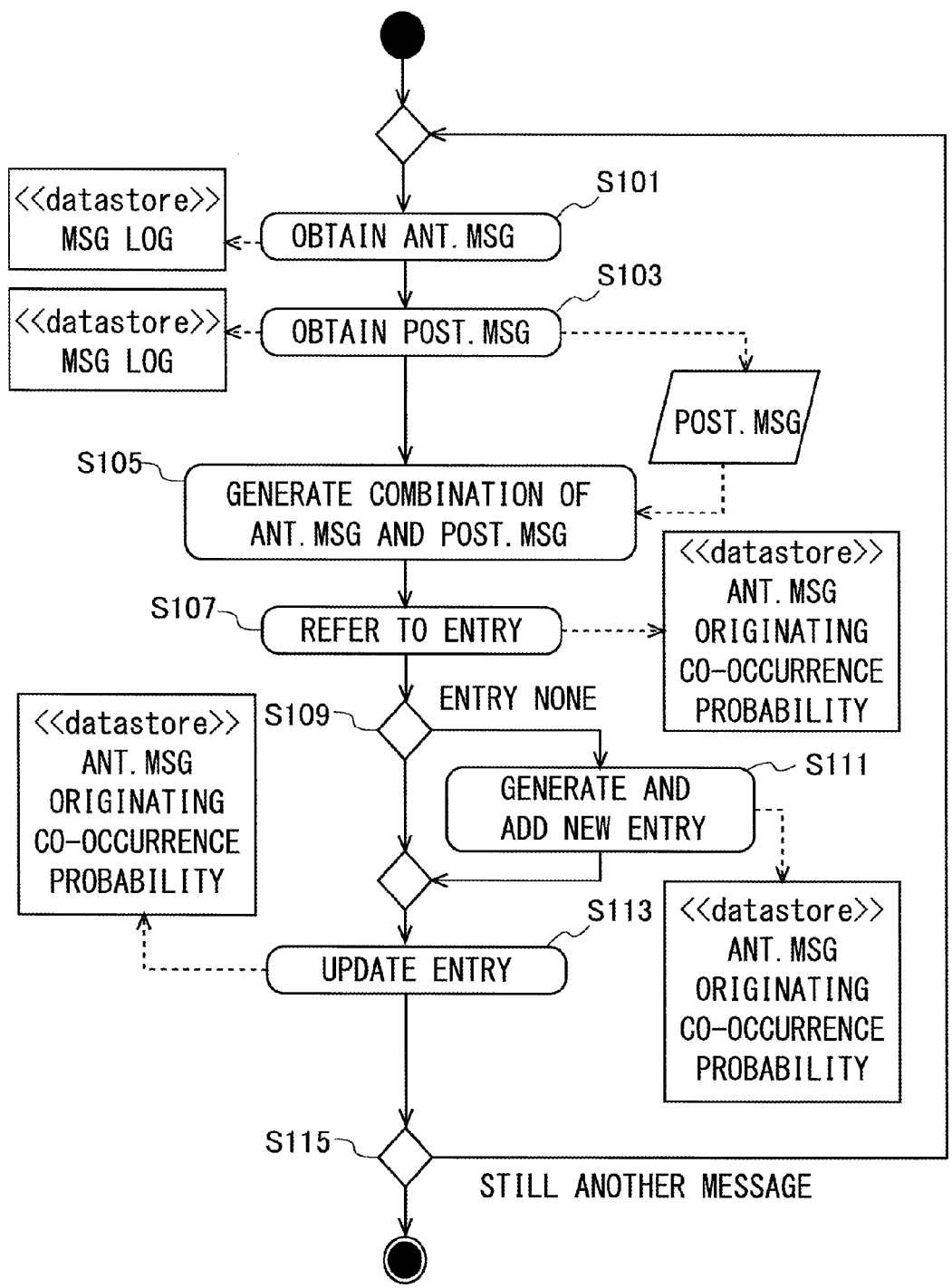
FIG. 9 is an activity diagram illustrating the processes performed by an anterior message originating co-occurrence probability calculating unit in an embodiment.

Next, the processes performed by the anterior message originating co-occurrence probability calculating unit 15 are described with reference to the activity diagram illustrated in FIG. 9. In the below descriptions of the activity diagram, each step is abbreviated as S. First, in S101 the anterior message originating co-occurrence probability calculating unit 15 refers to the message log stored in the message storing unit 20. And, the anterior message originating co-occurrence probability calculating unit 15 obtains one message as an anterior message which has been added by the log generating unit 12. Next, in S103 the anterior message originating co-occurrence probability calculating unit 15 refers to the message log stored in the message storing unit 20. And then, the anterior message originating co-occurrence probability calculating unit 15 obtains as posterior messages the messages which occur within the co-occurrence period after the message obtained as the anterior message occurs in the past. Thus, the anterior message originating co-occurrence probability calculating unit 15 generates the combinations of the anterior message and a variety of posterior messages (S105).

Next, in S107 the anterior message originating co-occurrence probability calculating unit 15 accesses the co-occurrence probability storing unit 30. And the anterior message originating co-occurrence probability calculating unit 15 refers to the entries of the combinations of the anterior message and the posterior messages which has been generated in S105. Namely, the anterior message originating co-occurrence probability calculating unit 15 refers to the entries of the combinations of the anterior message and the posterior messages in the table (the table illustrated in FIG. 8A as an example) of the anterior message originating co-occurrence probabilities stored in the co-occurrence probability storing unit 30.

When the anterior message originating co-occurrence probability calculating unit 15 fails to refer to appropriate entries in S107, the anterior message originating co-occurrence probability calculating unit 15 proceeds with the process from S109 to S111. That is, when an appropriate combination of the anterior message and the posterior message is not found in the table of the anterior message originating co-occurrence probabilities stored in the co-occurrence probability storing unit 30, the process moves from S109 to S111. On the other hand, when the entries of the combinations of the anterior message and the posterior messages which are generated in S105 are found in the table of the anterior message originating co-occurrence probabilities stored in the co-occurrence probability storing unit 30, the anterior message originating co-occurrence probability calculating unit 15 proceeds with the process from S109 to S113.

In S111, the anterior message originating co-occurrence probability calculating unit 15 adds as new entries the combinations of the anterior message and the posterior messages of the entries which the anterior message originating co-occurrence probability calculating unit 15 fails to find in S107 to the table of the anterior message originating co-occurrence probabilities stored in the co-occurrence probability storing unit 30.

In S113, the anterior message originating co-occurrence probability calculating unit 15 calculates the number of occurrences of the anterior message, the number of occurrences of the posterior message which occurs within the co-occurrence period and the anterior message originating co-occurrence probability for each combination of the anterior message and the posterior messages generated in S105. Incidentally, since the method of calculating the anterior message originating co-occurrence probabilities is as described above, the detailed descriptions are omitted here. And the anterior message originating co-occurrence probability calculating unit 15 updates the table of the anterior message originating co-occurrence probabilities stored in the co-occurrence probability storing unit 30 with the calculation results.

When another new message other than the anterior message obtained in S101 is added to the message storing unit 30 by the log generating unit 12, the anterior message originating co-occurrence probability calculating unit 15 returns the process from S115 to S101 and repeats the processes as described above. As described above, the control unit 19 detects the addition of the new message to the message storing unit 20. Therefore the anterior message originating co-occurrence probability calculating unit 15 returns the process from S115 to S101 according to the control by the control unit 19.

Figure 10:
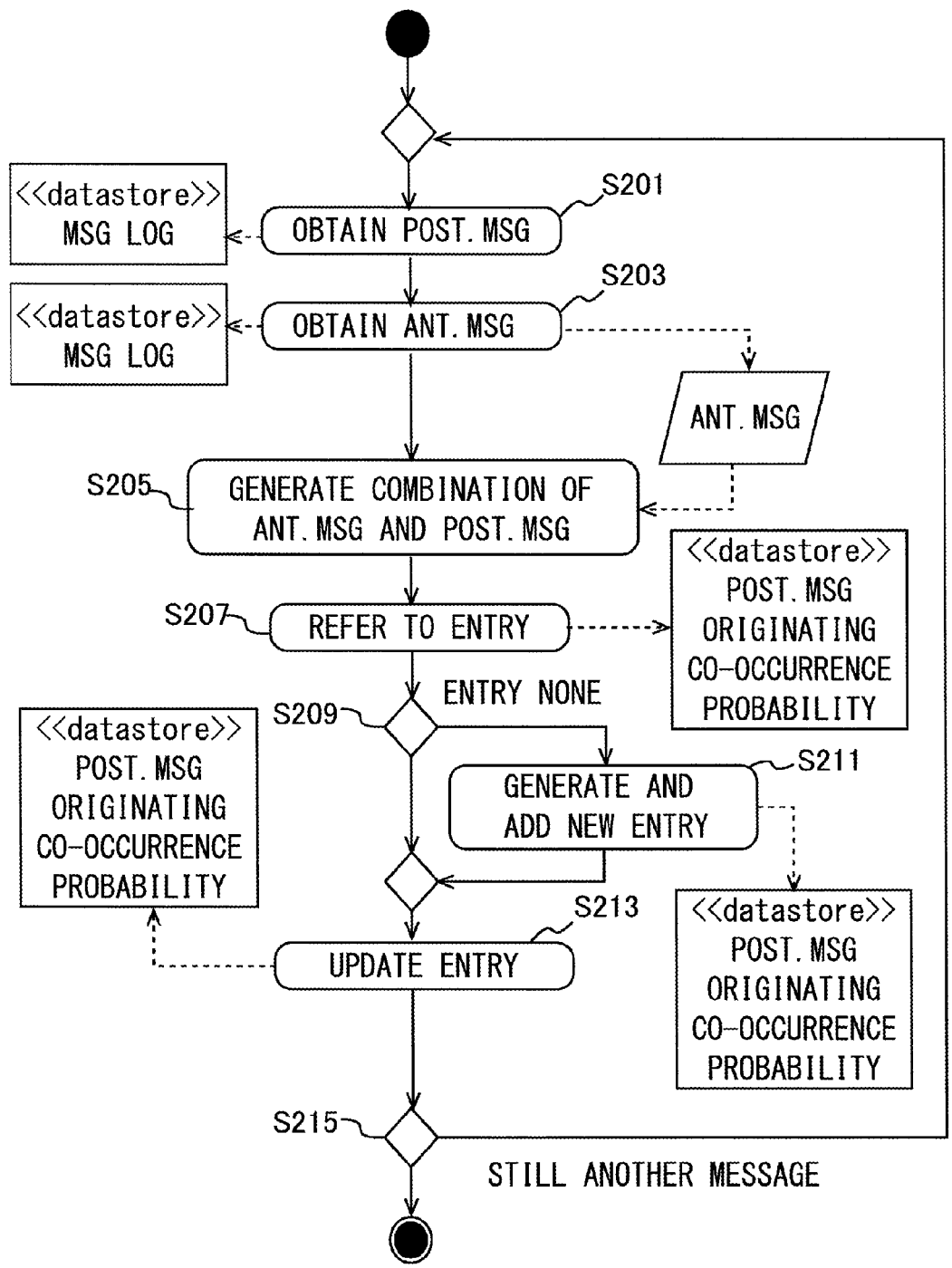
FIG. 10 is an activity diagram illustrating processes performed by a posterior message originating co-occurrence probability calculating unit in an embodiment.

Next, the processes performed by the posterior message originating co-occurrence probability calculating unit 16 are described with reference to the activity diagram illustrated in FIG. 10. First, in S201 the posterior message originating co-occurrence probability calculating unit 16 refers to the message log stored in the message storing unit 20 and obtains one message added by the log generating unit 12 as a posterior message. Next, in S203 the posterior message originating co-occurrence probability calculating unit 16 refers to the message log stored in the message storing unit 20. And the posterior message originating co-occurrence probability calculating unit 16 obtains as anterior messages the messages which occur within the co-occurrence period before the message obtained as the posterior message occurs. Thus, the posterior message originating co-occurrence probability calculating unit 16 generate the combinations of the posterior message and the anterior messages (S205).

Next, in S207 the posterior message originating co-occurrence probability calculating unit 16 accesses the co-occurrence probability storing unit 30. And the posterior message originating co-occurrence probability calculating unit 16 refers to the entries of the combinations of the posterior message and the anterior messages generated in S205. That is, the posterior message originating co-occurrence probability calculating unit 16 refers to the entries of the combinations of the posterior message and the anterior messages in the table (the table illustrated in FIG. 8B as an example) of the posterior message originating co-occurrence probabilities stored in the co-occurrence probability storing unit 30.

When the posterior message originating co-occurrence probability calculating unit 16 fails to the appropriate entries in S207, the posterior message originating co-occurrence probability calculating unit 16 proceeds with the process from S209 to S211. That is, when an appropriate combination of the posterior message and the anterior message is not found in the table of the posterior message originating co-occurrence probabilities stored in the co-occurrence probability storing unit 30, the process moves from S209 to S211. On the other hand, when the entries of the combinations of the posterior message and the anterior messages which are generated in S205 are found in the table of the posterior message originating co-occurrence probabilities stored in the co-occurrence probability storing unit 30, the posterior message originating co-occurrence probability calculating unit 16 proceeds with the process from S209 to S213.

In S211, the posterior message originating co-occurrence probability calculating unit 16 adds as new entries the combinations of the posterior message and the anterior messages of the entries which the posterior message originating co-occurrence probability calculating unit 16 fails to find in S207 to the table of the posterior message originating co-occurrence probabilities stored in the co-occurrence probability storing unit 30.

In S213, the posterior message originating co-occurrence probability calculating unit 16 calculates the number of occurrences of the posterior message, the number of occurrences of the anterior message which occurs within the co-occurrence period and the posterior message originating co-occurrence probability for each combination of the posterior message and the anterior messages generated in S205. Incidentally, since the method of calculating the posterior message originating co-occurrence probabilities is as described above, the detailed descriptions are omitted here. And the posterior message originating co-occurrence probability calculating unit 16 updates the table of the posterior message originating co-occurrence probabilities stored in the co-occurrence probability storing unit 30 with the calculation results.

When another new message other than the posterior message obtained in S201 is added to the message storing unit 30 by the log generating unit 12, the posterior message originating co-occurrence probability calculating unit 16 returns the process from S215 to S201 and repeats the processes as described above. As described above, the control unit 19 detects the addition of the new message to the message storing unit 20. Therefore the posterior message originating co-occurrence probability calculating unit 16 returns the process from S215 to S201 according to the control by the control unit 19.

Figure 11:
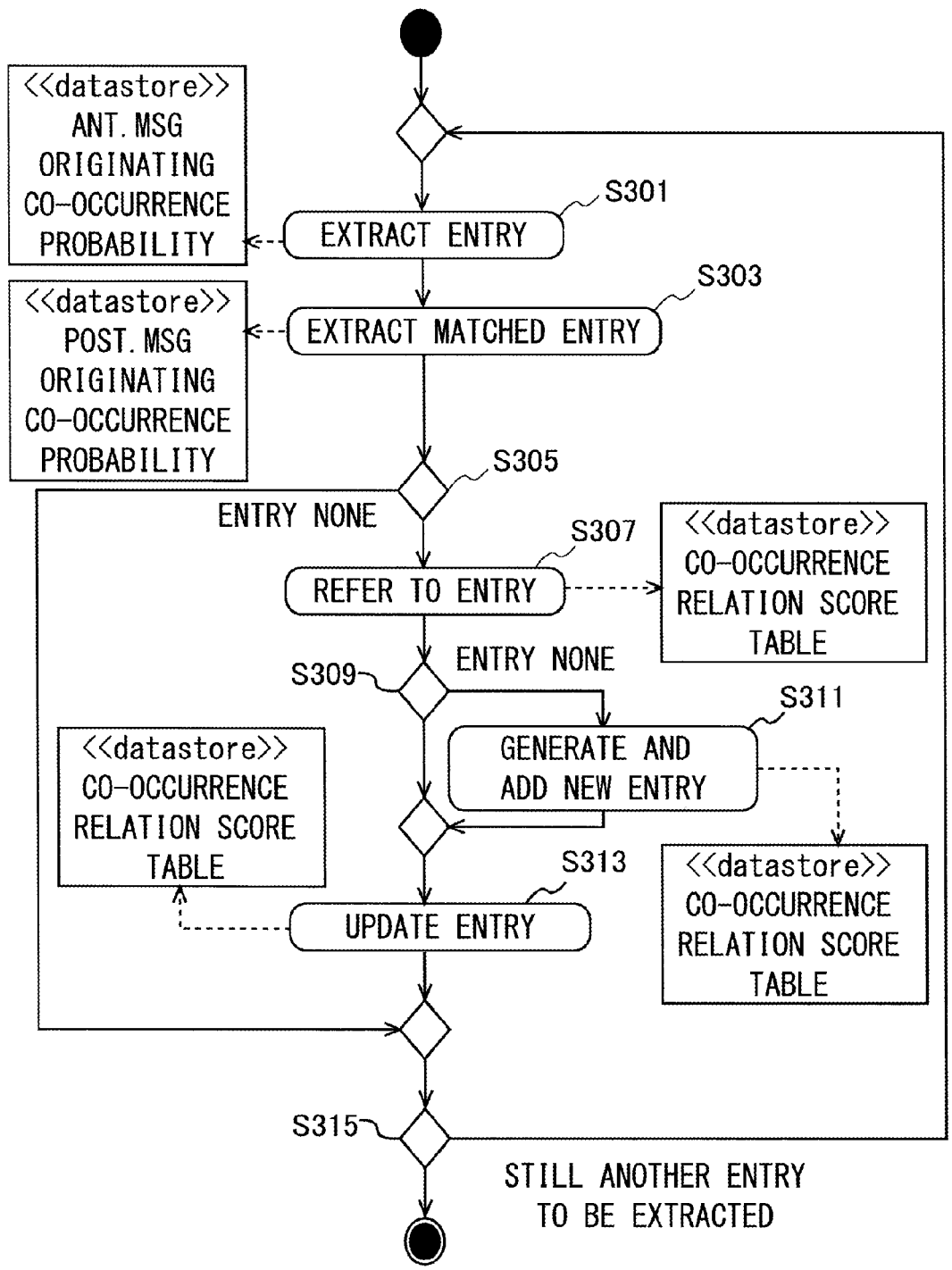
FIG. 11 is an activity diagram illustrating processes performed by a co-occurrence relation score calculating unit.

Next, the processes performed by the co-occurrence relation score calculating unit 17 are described with reference to the activity diagram illustrated in FIG. 11. First, in S301 the co-occurrence relation score calculating unit 17 accesses the co-occurrence probability storing unit 30. And the co-occurrence relation score calculating unit 17 extracts data of one entry from the table of the anterior message originating co-occurrence probabilities. The data extracted by the co-occurrence relation score calculating unit 17 may at least include a co-occurrence probability corresponding to a combination of an anterior message and a posterior message.

In addition, in the table of the anterior message originating co-occurrence probabilities in the co-occurrence probability storing unit 30, the control unit 19 adds to each entry extracted in S301 a flag (not illustrated) indicating that the entry has been extracted. Incidentally, an arbitrary method for indicating that the entry has been extracted may be employed other than using the flag as long as it may be determined that the entry has been extracted. In this way, when the co-occurrence relation score calculating unit 17 extracts the data of an entry in S301, the co-occurrence relation score calculating unit 17 refers to the flag to extract the entry which has not yet been extracted.

In S303 the co-occurrence relation score calculating unit 17 accesses the co-occurrence probability storing unit 30. And the co-occurrence relation score calculating unit 17 extracts data of the entry of the combination corresponding to the combination of the anterior message and the posterior message obtained in S301 from the table of the posterior message originating co-occurrence probabilities. Here again, the data extracted by the co-occurrence relation score calculating unit 17 may at least include a co-occurrence probability corresponding to a combination of an anterior message and a posterior message.

Here, when the entry of the combination of the anterior message and the posterior message obtained in S301 is not found in the table of the posterior message originating co-occurrence probabilities stored in the co-occurrence probability storing unit 30, the co-occurrence relation score calculating unit 17 does not extract the data of the entry in S303. In this case, the co-occurrence relation score calculating unit 17 proceeds with the process from S303 to S305, then to S315. When the co-occurrence relation score calculating unit 17 finds the data of the entry in S303, the co-occurrence relation score calculating unit 17 proceeds with the process to S305, then to S307.

In S307, the co-occurrence relation score calculating unit 17 accesses the co-occurrence relation storing unit 40. And the co-occurrence relation score calculating unit 17 refers to the entry of the combination of the posterior message and the anterior message in the co-occurrence relation table which is the same as the entry extracted in S301 and S303. Namely, the co-occurrence relation score calculating unit 17 refers to the entry of the combination of the posterior message and the anterior message in the table of the co-occurrence relation scores (the table illustrated in FIG. 8C as an example) stored in the co-occurrence relation storing unit 40.

When the co-occurrence relation score calculating unit 17 does not refer to an appropriate entry in S307, the co-occurrence relation score calculating unit 17 proceeds with the process from S309 to S311. Namely, when an appropriate combination of the posterior message and the anterior message is not found in the table of the co-occurrence relation scores stored in the co-occurrence relation storing unit 40, the process moves from S309 to S311. On the other hand, when the combination of the posterior message and the anterior message corresponding to the entry extracted in S301 and S303 may be found in the table of the co-occurrence relation scores stored in the co-occurrence relation storing unit 40, the co-occurrence relation score calculating unit 17 proceeds with the process from S309 to S313.

In S311, the co-occurrence relation score calculating unit 17 adds as a new entry the combinations of the anterior messages and the posterior messages of the entries which the co-occurrence relation score calculating unit 17 fails to find in S307 to the table of the co-occurrence relation scores stored in the co-occurrence relation storing unit 40.

In S313, the co-occurrence relation score calculating unit 17 calculates the co-occurrence relation score for the entry extracted in S301 and S303. Incidentally, since the method of calculating the co-occurrence relation scores is as described above, the detailed descriptions are omitted here. And the co-occurrence relation score calculating unit 17 updates the table of the co-occurrence relation scores stored in the co-occurrence relation storing unit 40 with the calculation results. Next, the co-occurrence relation score calculating unit 17 proceeds the process to S315.

In S315, the co-occurrence relation score calculating unit 17 refers to the table of the anterior message originating co-occurrence probabilities in the co-occurrence probability storing unit 30. And the co-occurrence relation score calculating unit 17 determines based on the flags attached to the entries as described above whether an entry to which the processes of calculating the co-occurrence relation score have not been performed is found or not. When the entry which has not been extracted is found, the co-occurrence relation score calculating unit 17 returns the process from S315 to S301 and repeats the processes as described above.

The processes as described above calculate the co-occurrence relation score for each combination of the anterior message and the posterior message. And then the table of the co-occurrence relation scores in which the calculated co-occurrence relation scores are gathered is generated and updated. Therefore, in the conventional configurations, a variety of operation administrative messages are mixed together so that the messages which do not have correlations with the other messages and occur periodically become noise. Therefore, the co-occurrence relations between the messages are not extracted with high accuracy in the message filtering and the message analysis. To the contrary, in the present embodiment, the co-occurrence relation scores as described above may be used to determine the co-occurrence relations between the messages with higher accuracy without performing message analyses and filter settings in advance.

In the present embodiment, the information processing apparatus 1 performs filtering processes based on the co-occurrence relations and report processes using the co-occurrence relation scores as described above for the messages received from each device in the server group 2 which is the target of the operation administration. The details of the filtering processes and the report processes are described below.

Figure 12:
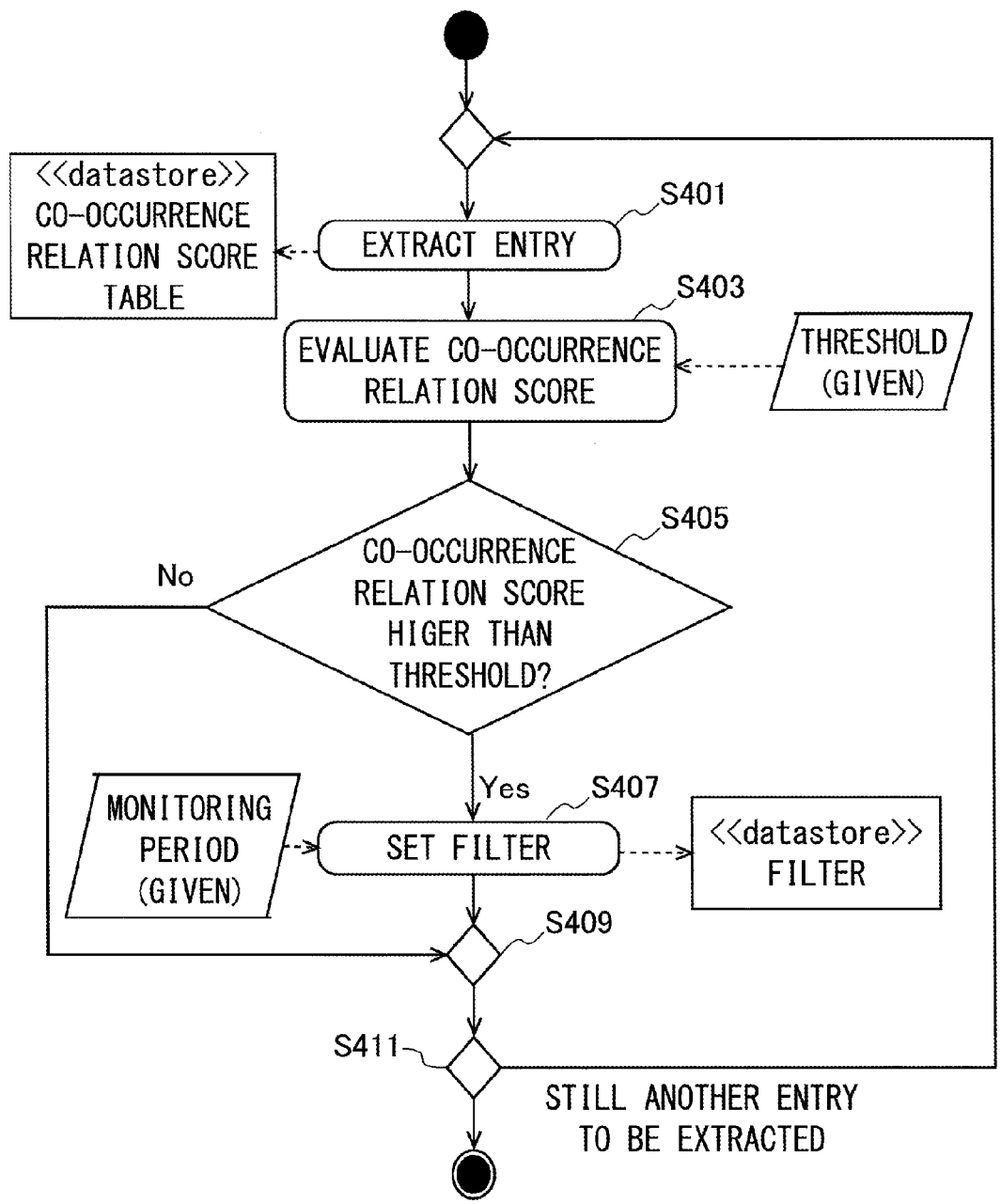
FIG. 12 is an activity diagram illustrating processes performed by a filter setting unit in an embodiment.

FIG. 12 is an activity diagram illustrating the filtering and report processes perform by the filter setting unit 18 of the information processing apparatus 1. First, in S401 the filter setting unit 18 accesses the co-occurrence relation storing unit 40. And the filter setting unit 18 extracts data of one entry from the table of the co-occurrence relation scores. Here, the data extracted by the filter setting unit 18 may at least include a co-occurrence relation score corresponding to a combination of an anterior message and a posterior message.

In addition, in the table of the co-occurrence relation scores in the co-occurrence relation storing unit 40, the control unit 19 adds to each entry extracted in S401 a flag (not illustrated) indicating that the entry has been extracted. Incidentally, an arbitrary method for indicating that the entry has been extracted may be employed other than using the flag as long as it may be determined that the entry has been extracted. In this way, when the filter setting unit 18 extracts the data of an entry in S401, the filter setting unit 18 refers to the flag to extract the entry which has not yet been extracted.

Next, in S403 the filter setting unit 18 uses a predetermined threshold to evaluate the co-occurrence relation score for the entry extracted in S401. Specifically, the filter setting unit 18 determines whether or not the co-occurrence relation score to be evaluated is higher than the threshold. The threshold may be a value which a user specifies in advance or an appropriate threshold which may be determined by a statistic analysis based on the report processes which have been performed, the co-occurrence relations between the messages and the like.

When the co-occurrence relation score to be evaluated is higher than the threshold (S405: Yes), the filter setting unit 18 proceeds with the process from S405 to S407. On the other hand, when the co-occurrence relation score to be evaluated is equal to or lower than the threshold (S405: No), the filter setting unit 18 proceeds with the process from S405 to S409 to S411. Incidentally, in S405 as described above the filter setting unit 18 determines whether or not the co-occurrence relation score is higher than the threshold. However, the filter setting unit 18 may be configured to determine whether or not the co-occurrence relation score is equal to or higher than the threshold. In this case, the filter setting unit 18 is configured to proceed with the process from S405 to S407 when the co-occurrence relation score is equal to or higher than the threshold.

In S407, the filter setting unit 18 sets a filter based on the data of the entry which has been evaluated in S405 for a message which the information processing apparatus receives from each device in the server group 2. FIGS. 13A and 13B illustrate examples of the filters set by the filter setting unit 18. The filter setting unit 18 sets filters each of which includes a predetermined monitoring period and handling information as well as an anterior message, a posterior message and a co-occurrence relation score included in the data of an entry. As illustrated in FIGS. 13A and 13B, a period indicating how long it is monitored after the message specified by the value set in the field "anterior message" occurs that the message specified by the value set in the field "posterior message" occurs is set as a value in the field "monitoring period (min)". In the present embodiment, the monitoring period is set to be 60 minutes as is the case for the co-occurrence period. As described above, the co-occurrence relation scores are determined based on the occurrence frequencies of messages within the co-occurrence period. Thus, when the monitoring period is set to be the same as the co-occurrence period, the filtering and report processes may be performed in accordance with the circumstances in which the messages occur. In addition, a period which is different from the co-occurrence period may be set to the monitoring period.

Further, a process which is performed by the filtering execution unit 13 when the message specified by the value set in the field "posterior message" occurs within the period specified by the value set in the field "monitoring period (min)" after the message specified by the value set in the field "anterior message" is set as a value in the field "handling". In the examples illustrated in FIGS. 13A and 13B, a value "ignore the posterior message" is set in the field "handling".

As described above, the entries to which filters are set in S407 are entries for which it is determined in S405 that the co-occurrence relation scores are higher than the threshold. Namely, it may be assumed that the co-occurrence relations of the anterior messages and the posterior messages included in these entries are stronger than the predetermined limit. Thus, when the messages corresponding to the anterior messages included in these entries occur, the administrator handles the messages. In addition, the administrator does not necessarily handle the messages corresponding to the posterior messages which subsequently occur within the monitoring period. Therefore, in S407 filters are set to "ignore the posterior message(s)" when the filtering execution unit 13 performs the message filtering. The filters set in S407 are stored in the filter storing unit 50.

After the filter setting unit 18 sets a filter in S407, the filter setting unit 18 proceeds with the process from S409 to S411. In S411, the filter setting unit 18 refers to the table of the co-occurrence relation scores in the co-occurrence relation storing unit 40. And the filter setting unit 18 unit determines based on the flag set to each entry as described above whether an entry which has not been extracted is found or not. When the entry which has not been extracted is found, the filter setting unit 18 returns the process from S411 to S401 and repeats the processes as described above.

Figure 14:
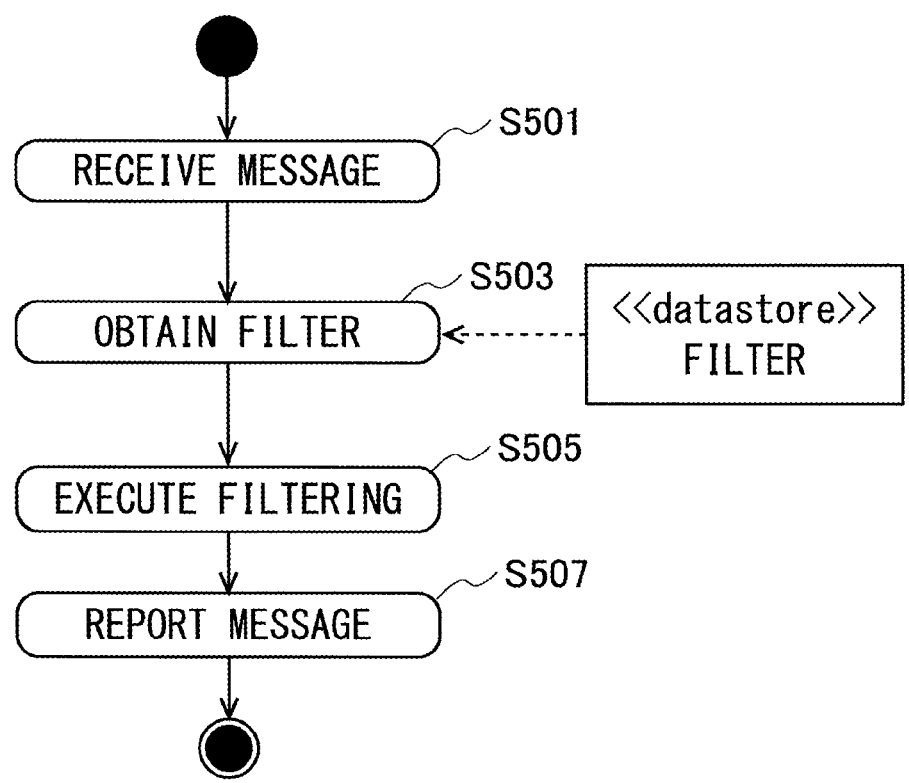
FIG. 14 is an activity diagram illustrating processes performed by a filtering performing unit and a reporting unit in an embodiment.

Next, the filtering processes and the report processes for messages performed by the filtering execution unit 13 and the reporting unit 14 are described. FIG. 14 is an activity diagram illustrating the filtering and report processes for messages performed by the filtering execution unit 13 and the reporting unit 14. In S501, the filtering execution unit 13 receives a message from the log generating unit 12. Next, in S503 the filtering execution unit 13 obtains a filter stored in the filter storing unit 50. And then in S505 the filtering execution unit 13 uses the obtained filter to execute the filtering of the received message. In S507, the reporting unit 14 reports the message to the administrative computer 3 via the network N based on the filtering result in S505.

For example, the filtering execution unit 13 executes the filtering using the filters illustrated in FIGS. 13A and 13B when the received message is "PP0099". The filter illustrated in FIG. 13A indicates that the message "SV0188" may be received in 67% within 60 minutes after the message "PP0099" is received.

Therefore, for the combination of the anterior message "PP0099" and the posterior message "SV0188" the reporting unit 14 reports the administrative computer 3 that the message "PP0099" is received. In addition, the messages "SV0188" which occur within the monitoring period are ignored by the filtering processes as described above. Thus, the messages "SV0188" are not reported to the administrative computer 3 by the reporting unit 14. Consequently, the administrator may handle the reported message "PP0099". In addition, once the administrator handles the reported message "PP0099", the administrator does not have a trouble with a report of the message "SV0188" which is not to be handled.

Additionally, the filter illustrated in FIG. 13B indicates that the message "PP0099" may be received in 99% within 60 minutes after the message "PP0099" is received.

Therefore, for the combination in which both the anterior message and the posterior message are "PP0099" the reporting unit 14 reports the first received message "PP0099" to the administrative computer 3. In addition, the messages "PP0099" which are repeatedly received within the monitoring period after the first message "PP0099" is received are ignored by the filtering processes as described above. Thus, the messages "PP0099" are not reported to the administrative computer 3 by the reporting unit 14. Consequently, the administrator may handle the first message "PP0099" which is reported. In addition, once the administrator handles the reported message "PP0099", the administrator does not have a trouble with a report of the subsequent same message "PP0099" which is not to be handled.

As described above, in the present embodiment the co-occurrence relations between the messages are determined in consideration of the co-occurrence probabilities with designating the anterior messages as the starting point and the co-occurrence probabilities with designating the posterior messages as the starting point. Therefore, the information processing apparatus 1 may determine the co-occurrence relations between the messages regardless of the influences from the messages which do not have correlations with each other. In addition, the information processing apparatus 1 may use the determined co-occurrence relations to execute the filtering of the messages with high accuracy. Further, in the present embodiment the means, for example harmonic means, of the co-occurrence probabilities with designating the anterior messages as the starting point and the co-occurrence probabilities with designating the posterior messages as the starting point are calculated to determine the co-occurrence relations. Thus, the information processing apparatus 1 may determine the co-occurrence relations between the messages with high accuracy and use the co-occurrence relations to execute the message filtering with high accuracy.

When the information processing apparatus 1 particularly uses the harmonic means to determine the co-occurrence relations, both the co-occurrence probabilities with designating the anterior messages as the starting point and the co-occurrence probabilities with designating the posterior messages as the starting point are to be significantly high for a significantly high co-occurrence relation score. Thus, in the present embodiment the harmonic means may be used to calculate the co-occurrence relation scores reflecting the correlations between the messages with higher accuracy.

Although the present embodiment is described as above, the configurations and the processes of the information processing apparatus 1, the server group 2, the administrative computer 3, the network N and the like are not limited to those as described above and various variations may be made to the embodiment described herein within the technical scope of the present invention. For example, although the harmonic means are calculated in the above embodiment, a variety of means including arithmetic means and geometric means may be employed. In addition, the means may be calculated by weighing each period accordingly according to the settings of the co-occurrence periods. Moreover, the present embodiment may be applied not only to datacenters but also to a variety of situations including factories, plants, various online systems, building administration systems.

<<Computer Readable Recording Medium>>

It is possible to record a program which causes a computer to implement any of the functions described above on a computer readable recording medium. By causing the computer to read in the program from the recording medium and execute it, the function thereof can be provided. Here, the computer includes the control unit 19 of the information processing apparatus 1 for example.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

An information processing apparatus, an information processing method and a program according to the embodiment as described above may be employed for the filtering processes for the messages received from each device when a variety of devices are administered in the cloud environments and the like.

A program according to one embodiment may improve the filtering accuracy of failure messages.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
   a processor; and
   memory storing instructions for causing the processor to execute:
   generating a message log including a plurality of messages sent from a device;
   calculating for the plurality of messages included in the message log a first probability of a case that after a first message occurs a second message occurs within a first period;
   calculating a second probability of a case that before the second message occurs the first message occurs within a second period;

calculating a harmonic mean of the first probability and the second probability to calculate a value which indicates a co-occurrence relation of the first message and the second message;

setting, when the calculated value which indicates the co-occurrence relation is equal to or more than a predetermined threshold, a filter to ignore a message which matches with the second message sent from the device within a third period after a message which matches with the first message is sent from the device;

filtering a message sent from the device based on the filter; and performing a report in relation to the device based on a result of the filtering, the report including the first message and not including the second message.

2. An information processing method, comprising the following processor-implemented operations including:

generating, by a processor, a message log including a plurality of messages sent from a device;

calculating for the plurality of messages included in the message log a first probability of a case that after a first message occurs a second message occurs within a first period;

calculating a second probability of a case that before the second message occurs the first message occurs within a second period;

calculating a harmonic mean of the first probability and the second probability to calculate a value which indicates a co-occurrence relation of the first message and the second message;

setting, when the calculated value which indicates the co-occurrence relation is equal to or more than a predetermined threshold, a filter to ignore a message which matches with the second message sent from the device within a third period after a message which matches with the first message is sent from the device;

filtering a message sent from the device based on the filter; and performing a report in relation to the device based on a result of the filtering, the report including the first message and not including the second message.

3. A non-transitory computer-readable storage medium having stored therein a program for causing a computer to execute a moving image output process comprising:

generating, by a processor, a message log including a plurality of messages sent from a device;

calculating for the plurality of messages included in the message log a first probability of a case that after a first message occurs a second message occurs within a first period;

calculating a second probability of a case that before the second message occurs the first message occurs within a second period;

calculating a harmonic mean of the first probability and the second probability to calculate a value which indicates a co-occurrence relation of the first message and the second message;

setting, when the calculated value which indicates the co-occurrence relation is equal to or more than a predetermined threshold, a filter to ignore a message which matches with the second message sent from the device within a third period after a message which matches with the first message is sent from the device;

filtering a message sent from the device based on the filter; and performing a report in relation to the device based on a result of the filtering, the report including the first message and not including the second message.

* * * * *